United States Patent
Hill

(10) Patent No.: US 7,125,175 B2
(45) Date of Patent: Oct. 24, 2006

(54) OPTICAL COUPLING DEVICES

(75) Inventor: Roger Hill, Silverburn (GB)

(73) Assignee: Selex Sensors and Airborne Systems Limited, Essex (GB)

( * ) Notice: Subject to any disclaimer, the term of this patent is extended or adjusted under 35 U.S.C. 154(b) by 0 days.

(21) Appl. No.: 10/498,545

(22) PCT Filed: Apr. 29, 2004

(86) PCT No.: PCT/GB2004/001860

§ 371 (c)(1),
(2), (4) Date: Jul. 13, 2004

(87) PCT Pub. No.: WO2004/097478

PCT Pub. Date: Nov. 11, 2004

(65) Prior Publication Data

US 2005/0105870 A1    May 19, 2005

(30) Foreign Application Priority Data

May 1, 2003 (EP) ................................. 03252805
May 1, 2003 (GB) ................................. 0310016.1

(51) Int. Cl.
*G02B 6/32* (2006.01)
(52) U.S. Cl. .......................... 385/93; 385/33
(58) Field of Classification Search .............. None
See application file for complete search history.

(56) References Cited

U.S. PATENT DOCUMENTS

| | | |
|---|---|---|
| 4,412,720 A | 11/1983 | Costa |
| 4,687,285 A | 8/1987 | Hily et al. |
| 4,705,351 A | 11/1987 | Toda |
| 4,753,521 A | 6/1988 | Deserno |
| 5,013,120 A | 5/1991 | Gergely et al. |
| 5,513,201 A | 4/1996 | Yamaguchi et al. |
| 6,125,222 A | 9/2000 | Anthon |
| 6,374,012 B1 | 4/2002 | Bergmann et al. |
| 6,625,372 B1 | 9/2003 | Flanders et al. |
| 2002/0109926 A1 | 8/2002 | Horwitz |
| 2002/0186915 A1 | 12/2002 | Yu et al. |

FOREIGN PATENT DOCUMENTS

| | | |
|---|---|---|
| DE | 3625712 | 2/1988 |
| DE | 197 16 604 | 10/1998 |
| DE | 100 39 825 | 3/2002 |
| EP | 0 864 892 | 9/1998 |
| EP | 1 233 291 | 8/2002 |
| EP | 1 298 476 | 4/2003 |
| GB | 2 220 501 | 1/1990 |
| JP | 2-170588 | 7/1990 |
| JP | 2000-171665 | 6/2000 |
| JP | 2001-290054 | 10/2001 |

*Primary Examiner*—Sung Pak
(74) *Attorney, Agent, or Firm*—Nixon & Vanderhye P.C.

(57) ABSTRACT

A laser transmitter unit is described, the unit including a laser diode 2 emitting laser radiation into a lens system. The lens system includes collimating lenses L1, L3 and focussing lenses L2, L4. Additionally, compensating or steering lens S1, S2 are positioned between the collimating lenses L1, L3 and the focussing lenses L2, L4. The steering lenses S1, S2 act to reduce the sensitivity of the focussing lenses L2, L4 to position within the lens system. The position of the focussing lenses can be difficult to control, particularly when the lenses are welded into position in the laser transmitter unit 1.

20 Claims, 6 Drawing Sheets

OPTICAL COUPLING DEVICES

This application is the US national phase of international application PCT/GB2004/001860, filed 29 Apr. 2004, which designated the US. PCT/GB2004/001860 claims priority to GB Application No. 0310016.1, filed 1 May 2003 and EP Application No. 03252805.1 filed 1 May 2003. The entire contents of these applications are incorporated herein by reference.

The present invention relates to optical devices. More particularly but not exclusively, the invention relates to a method of improving the optical coupling between several apertures in a laser transmitter unit.

Optical devices with transmitting and receiving apertures may be coupled by a lens or lenses. Commonly, the coupling of these apertures is very sensitive to the relative and absolute positioning of each lens. This effect is particularly noticeable when coupling apertures whose dimensions are of the order of a few microns. In known laser transmitter units using such coupling lenses and lens systems, a change in the position of one lens relative to another by as little as 1 μm can reduce the coupling by a significant amount. For example, coupling reductions of 1–10 dB have been known.

During assembly of such components, the lenses are typically manipulated into position by pneumatic grippers and are bonded or customarily welded into place using laser welding. Movement of the lens during cooling and 'setting' of the weld in most cases will result in significant 'post-weld drift'. During the welding of the lenses into position, both sides of each lens are welded into position into lens holders simultaneously in order to try to minimise post-weld shifting of the lenses. However, the post-weld drift of lenses, even with the most accurate welding can be 0.5 μm or more. Therefore, this will reduce the coupling efficiency by significant amounts.

According to the invention there is provided a method of reducing the sensitivity of an optical device to post-weld drift, the device including a radiation emitter or detector and a lens system including a collimating lens, a focussing lens and a compensating lens, the method comprising the steps of positioning and fixing the collimating lens; positioning the focusing lens to obtain optimum coupling to an output device and welding the focusing lens in position; positioning the compensating lens between the radiation emitter or detector and the focussing lens and adjusting the position of the compensating lens for optimum coupling and fixing the compensating lens.

In this way, the accuracy of the positioning of the lenses and the effect of the post-weld drift will not adversely affect the coupling between the lenses and as a result the yield of the final component will be increased.

The compensating lens is of greater focal length than the focusing lens and is preferably a positive lens, to reduce spherical aberration when used in conjunction with a positive lens of short focal length. However, the compensating lens could also be a negative lens.

The invention will now be described with reference to the following drawings in which, FIG. 1 is a schematic cross sectional drawing showing a typical laser transmitter including two modules M1, M2, each module including a lens system having two lenses L1, L2, L3 and L4, FIG. 2 is a graph showing the output of lens two L2, in the lens system in module one, as a function of position in X and Y directions, FIG. 3 is a schematic plan view of a laser transmitter, in accordance with one form of the invention, showing a laser diode transmitting radiation through a lens system, the lens system including two modules (each module having three lenses L1, L2, S1, L3, L4 and S2) an isolator and a modulator, FIG. 4 is a schematic drawing showing a laser transmitter including two modules, each module including a lens system having two lenses L1 and L2 and an additional compensating lens S1 in accordance with one form of the invention, FIG. 5 is a magnified view of the first module of FIG. 1 showing an additional steering or compensating lens interposed between two lenses in accordance with one form of the invention, FIGS. 6A, 6B and 6C are magnified views of the first module of FIG. 1 showing various steps of the method of reducing the sensitivity of the module to post-weld drift, in particular showing the step positioning of the collimating lens of the module according to different embodiments of the present invention;

FIGS. 7A, 7B 7C and 7D are magnified views of the first module of FIG. 1 showing various steps of the method of reducing the sensitivity of the module to post-weld drift, in particular showing the steps of positioning and fixing of the focusing and compensating lenses of the module according to different embodiments of the present invention;

Figure 1:
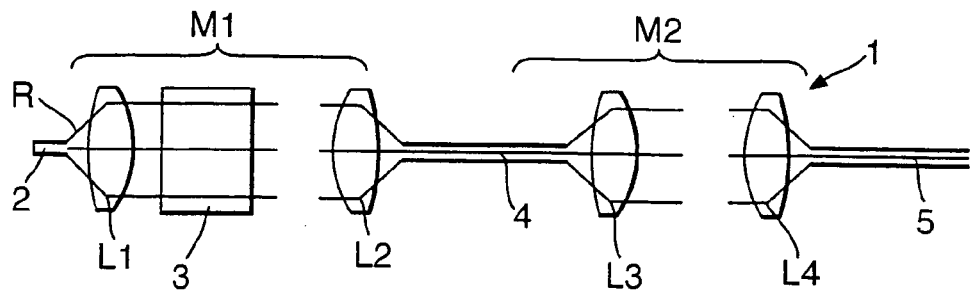

FIG. 1 shows a cross sectional diagram of a typical laser transmitter 1. The laser transmitter 1 includes two modules M1 and M2, each module including two lenses L1, L2, L3 and L4. Radiation R emitted by the laser diode 2 is incident on the collimating lens L1 that acts to collimate the radiation R. The collimating lens L1 transmits the radiation R to an isolator 3 that outputs radiation onto the lens L2 that acts to focus the radiation R onto a modulator 4 that modulates the radiation R. The radiation R is then transmitted to module M2 and is incident on lens L3 that acts to collimate the radiation R. The collimating lens L3 transmits the radiation R onto lens L4 that acts to focus the radiation R onto an output fibre 5 for onward transmission.

The most sensitive components are those in the first module M1, between the laser diode and the modulator. In the most probable alignment method, lens L1 and the isolator will be fixed in place first, followed by lens L2, adjacent the modulator 4.

During assembly, a pneumatic gripper holds the lenses L1, L2, L3, L4 and their relative positions are adjusted for maximum output. The smallest step in motion is of the order of 50 nm. When the peak output has been obtained from a detector (not shown), the lenses are welded into place by two lasers. Both sides of each lens are welded simultaneously in order to minimise 'post weld drift'—drift that may occur as the weld cools. In order to minimise this post weld drift, the outputs of the welding lasers need to be carefully controlled, which can be difficult in practice. It is not uncommon for the standard deviation of the post weld drift to be of the order of 0.5 μm.

Figure 2:
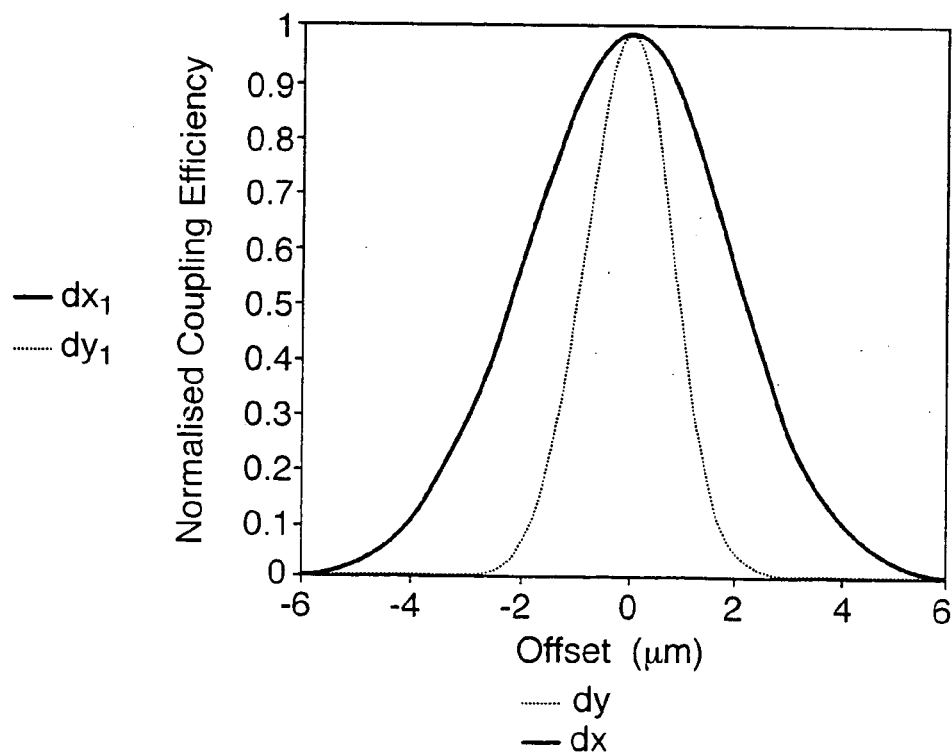

FIG. 2 shows the positional sensitivity of the lens L2 in module 1. The output of lens L2 is shown as a function of position in both X and Y-axes.

In the above-described component, if the positional accuracy is 50 nm and the standard deviation of the post weld drift is 0.5 μm then the yield of laser transmitter units whose coupling level is 95% of maximum attainable value is about a third. However, the yield of laser transmitter units whose coupling is a half of the maximum level is about 95%. This leads to an unacceptably high failure rate of laser transmitter units.

It is possible to remove and reposition lenses but this can damage the other more expensive components in the laser transmitter unit, such as the modulator 4 and the isolator 3. Removal of these more expensive components prior to repositioning of the lenses is again possible but expensive, time-consuming and may still lead to damage.

Figure 3:
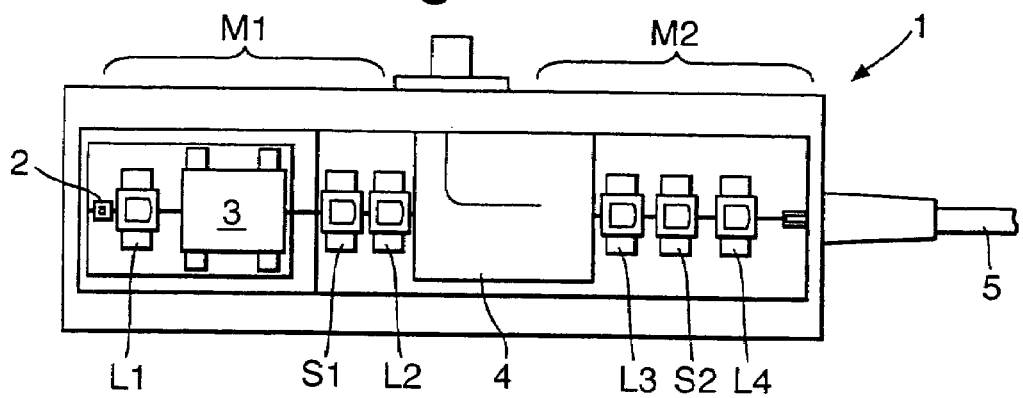
Figure 4:
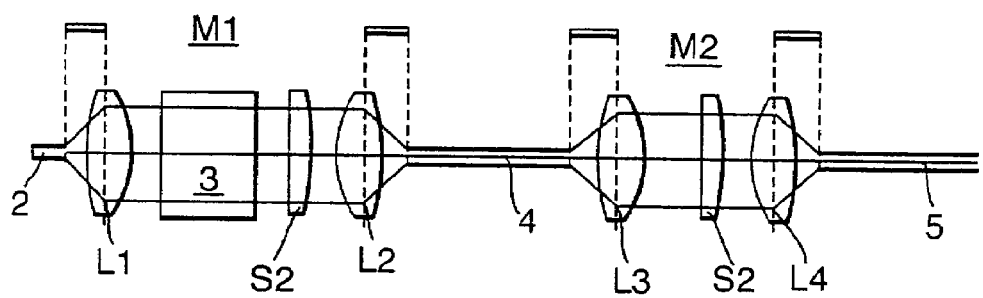
Figure 5:
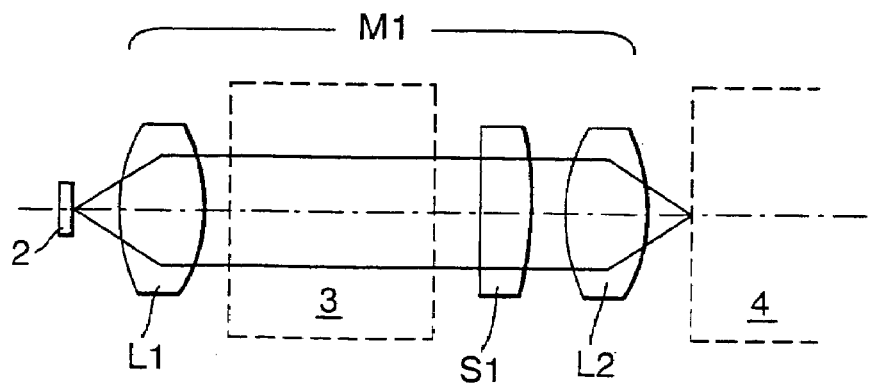

FIGS. 3, 4 and 5 show a laser transmitter unit similar to that described above. However, additional 'steering' or compensating lenses S1, S2 are disposed between lenses L1 and L2, and L3 and L4 respectively. The lenses S1 and S2 are 'weaker' than lenses L1, L2, L3 and L4 and are inserted into the path between the collimating lenses L1, L3 and the focussing lenses L2, L4. The lenses S1, S2 should have a generally longer focal length than the lenses L1, L2, L3 and L4—of the order of 10 or 20 times the focal length of the lenses L. The steering lenses S1 and S2 are adjusted to correct positional errors caused by post weld drift of focusing lens L2 by restoring the X and Y positions of the focal point at the modulator after the focussing lenses L2, L4 have been welded. Movement of the lenses S1, S2 has a reduction gearing effect that is proportional to their focal length.

During assembly of the laser transmitter unit modified in accordance with one form of the invention, allowance must be made for the combined focussing power of all the lenses in each module (L1, L2 and S1 in module M1 and L3, L4 and S2 in module M2). During the alignment process of each module, the collimating lens L1, L3 and the isolator will be adjusted and fixed in place first, followed by the focusing lens L2, L4 adjacent the modulator 4 and finally the steering lens S1, S2 are positioned.

Figure 6A:
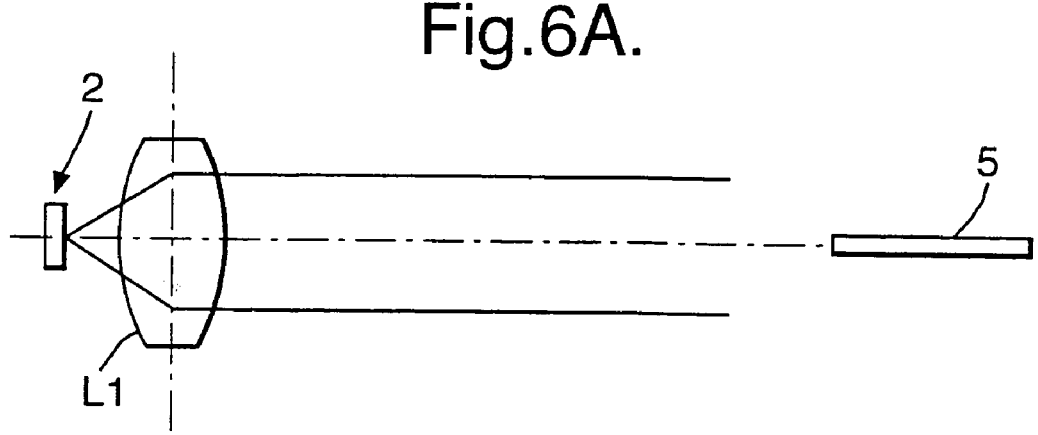
Figure 6B:
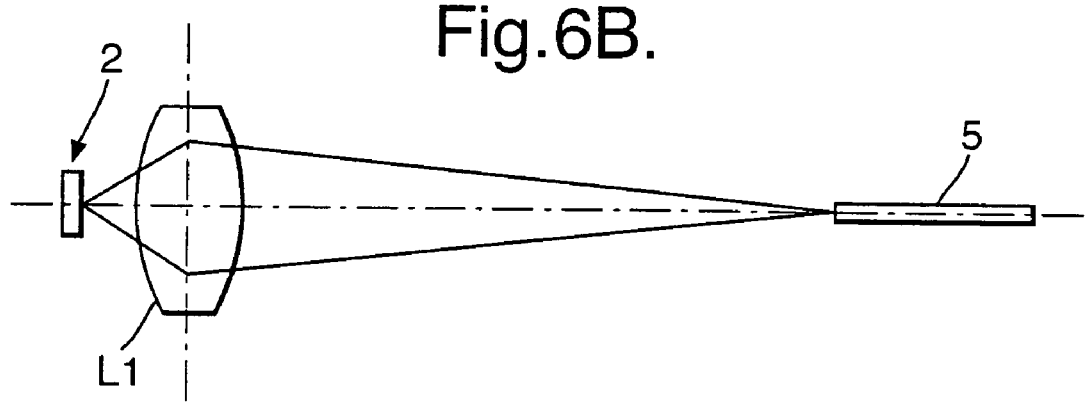
Figure 6C:
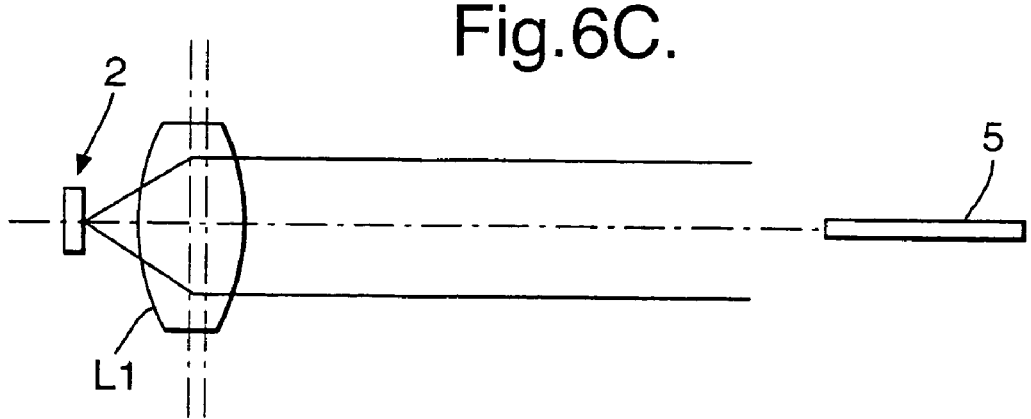

As described with reference to FIG. 1, a pneumatic gripper is used to holds the lenses L1, L2, L3 and L4. In a first step, the collimating lens L1 is positioned and welded into place. As is illustrated in FIG. 6A, the position of collimating lens L1 relative to the laser diode is adjusted until maximum output is achieved from another collimating device such as a collimator attached to a power meter and then welding the lens L1 into position as is described with reference to FIG. 1. Alternatively, as is illustrated in FIGS. 6B and 6C, the position of the collimating lens L1 may be varied until a maximum output is obtained from the output device and lens L1 is then moved by a predetermined amount so as to produce the required collimation of the beam and is welded into position. In an alternative embodiment shown in FIG. 6D, the positions of collimating lens L1 and focusing lens L2 can be varied in an iterative fashion until optimum coupling is achieved. The collimating lens L1 is then welded into position.

Figure 7A:
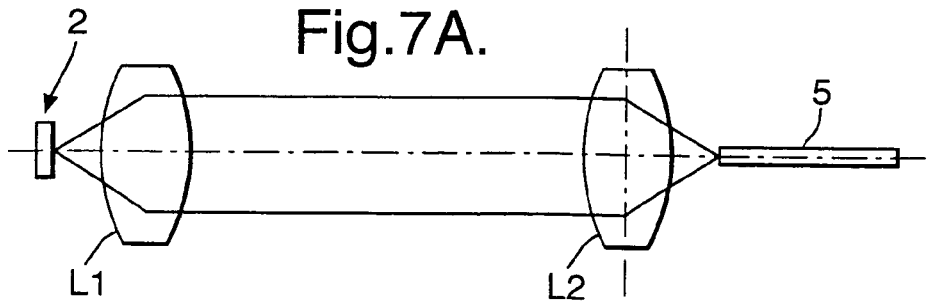
Figure 7B:
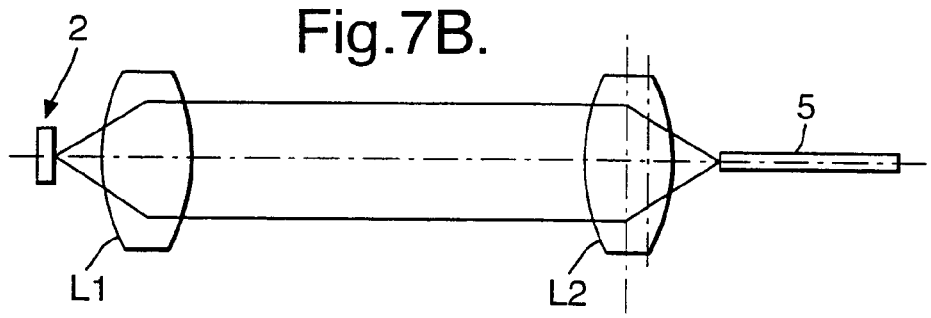

In the next step illustrated in FIGS. 7A and 7B, the focusing lens L2 is adjusted for optimum coupling to the output device and is then moved towards the modulator 4 by a predetermined distance (for example, 88.3 μm) which is calculated from the focal lengths of the focusing lens L2 and the steering lens S1. This offset in the positioning of lens S2 serves to correct the change in the position of the focal point caused by adding the steering lens S1 The focusing lens L2 is then welded into position.

Figure 7C:
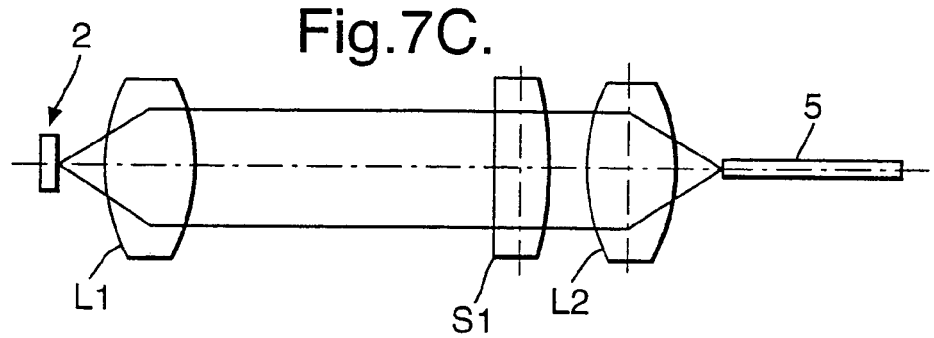

Finally as shown in FIG. 7C, the steering lens S1 is then inserted into the radiation path and is adjusted for maximum output or coupling. The steering lens S1 is then welded into position.

Figure 7D:
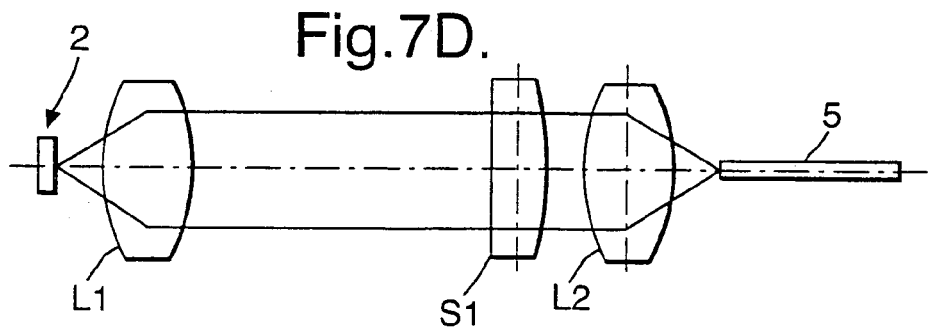

Alternatively as is shown in FIG. 7D, after fixing of the collimating lens L1, the pneumatic grippers can position the lenses L2, S1 simultaneously, the lenses L2 and S1 being spaced by a predetermined distance, say 1 mm. The position of both focusing lens L2 and steering lens S1 is varied until optimum coupling is achieved. The focusing lens L2 is then welded into position and, on cooling of the weld, the steering lens S1 is further adjusted to compensate for any deviation from the optimum value which has occurred. The steering lens S1 is then welded into position.

Figure 8:
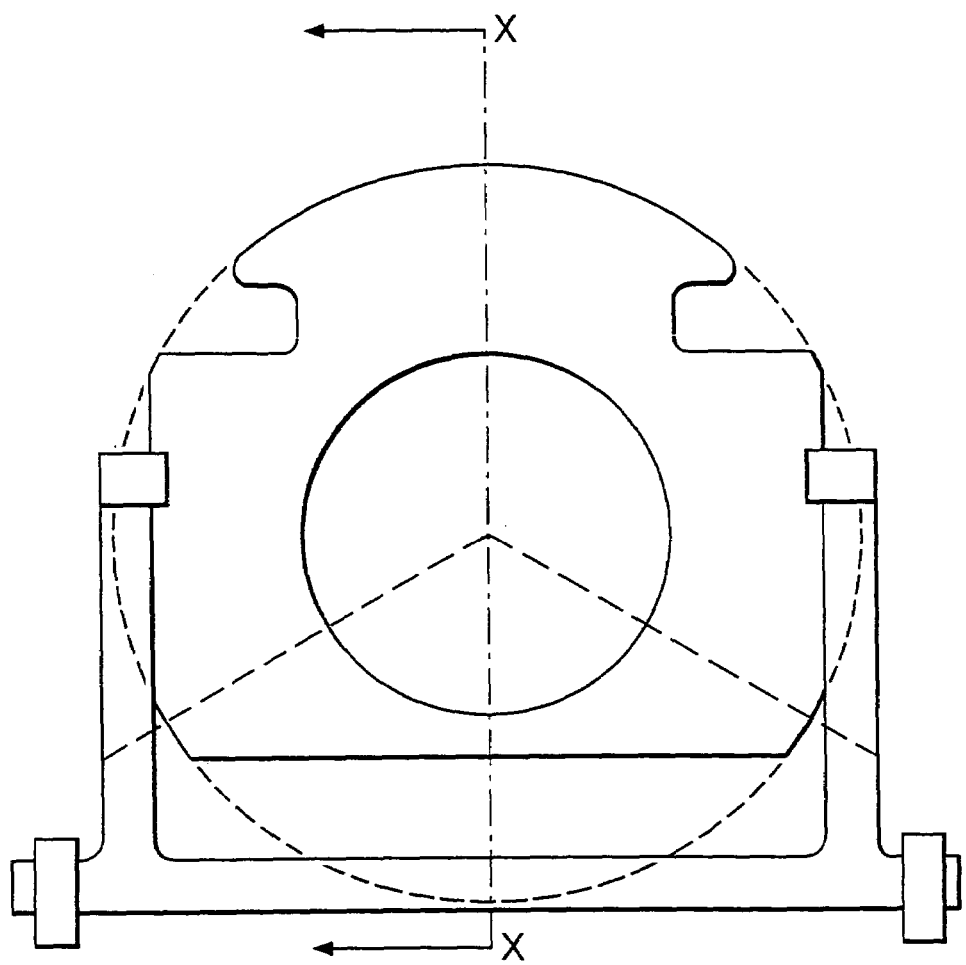
FIG. 8 is a schematic cross sectional drawing showing the weld positions of the focusing lens within a lens holder and clip assembly.

The lenses L3, L4 and S2 of module M2 are aligned in a similar way. FIG. 8 shows the focusing lens holder and its mounting clip. As can be seen, there are two symmetrical weld positions on each side of the lens holder and clip assembly so as to achieve equal contraction on each side on cooling of the weld.

Figure 9:
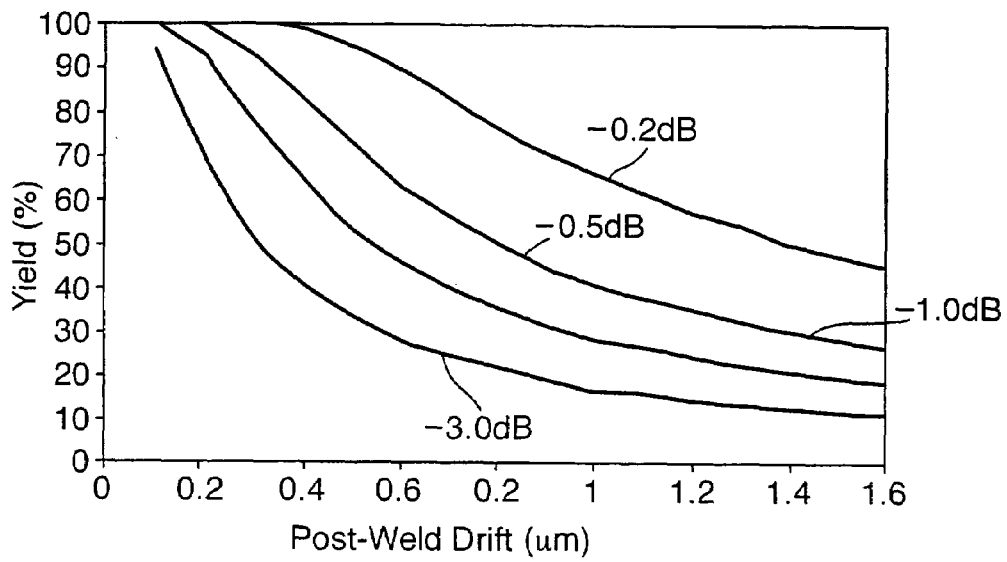
FIG. 9 is a graph of yield of laser transmitter modulators as a function of post weld drift.
Figure 10:
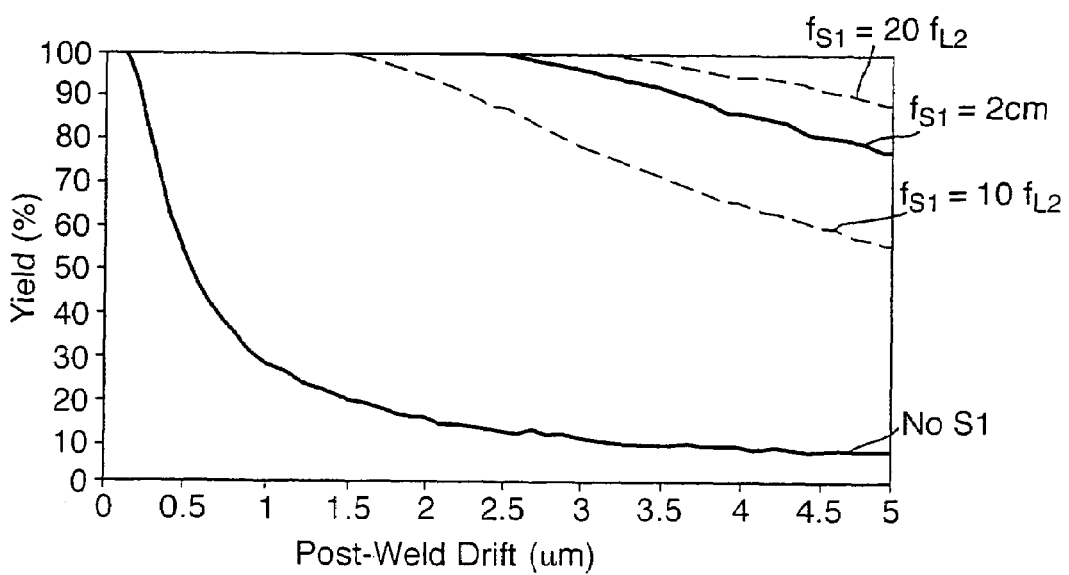
FIG. 10 is a graph showing the comparison of yield of laser transmitter modulators with and without compensating lenses interposed between the lenses of the lens systems in the modules.

FIG. 9 shows the yield of laser transmitter modules with a single focussing lens L2 and with three different steering lenses S1 having different focal lengths. The dotted lines correspond to different steering lenses S1 having focal lengths of 10 and 20 times that of the single focusing lens L2. The solid line shows the result expected when a steering lens S1, with a focal length of 2 cm, is used in conjunction with a focussing lens L2, having a focal length of 1.27 mm.

As can be seen from FIG. 9, the effect of adding the steering lens S1 is to increase the yield to 100% out to a standard deviation of the post weld drift of 2 μm. This increase in post weld drift would allow a lower control accuracy or stability of the laser welding power levels to be used. Furthermore, fewer laser transmitter units would have to be rejected or modified.

In the example described above, the collimating lens L1 has an effective focal length of 0.78 mm, a working distance of 0.15 mm, a clear aperture of 1.3 mm and a numerical aperture of 0.83. Lens L2 has an effective focal length of 1.27 mm, a working distance of 0.25 mm, a clear aperture of 1.5 mm and a numerical aperture of 0.59. The steering lens S1 has an effective focal length of 20 mm, a clear aperture of 1.8 mm and a numerical aperture of 0.045. The radiation emitted by the laser diode has a wavelength of 1530 nm.

It will be appreciated that the lenses L1, L2 and S1 need not have the values described above but that any lenses suitable for the purposes described may be used.

Moreover, the lenses L3, L4 and S2 need not have the same values as the lenses L1, L2 and S1 and again any lenses suitable to perform the function described above may be used.

Furthermore, although the lenses in the figures are depicted as convex-convex lenses any suitable form of lens or lens combination may be used. For example, the lens L1 may be replaced with a combination of lenses performing the same function.

The isolator 3 and the modulator 4 used perform their usual functions and as such have not been described in detail here.

The radiation R emitted by the laser diode 2 need not be 1530 nm but may be any suitable wavelength emitted by a radiation emitter. Furthermore, the use of the description 'optical device' does not limit the invention to use with visible radiation any suitable radiation emitter may be used.

Additionally, in the embodiment described above the invention is described with reference to a radiation emitter. The invention will operate in the same manner for a radiation detector. Furthermore, the optical device described above comprises a radiation emitter, a modulator and an output fibre. These are coupled by lens systems including a collimating lens and a focussing lens. It will be appreciated that the invention as described is equally applicable to an optical device comprising a radiation emitter or detector coupled to input or output means via only a focussing lens and an additional compensating lens.

The invention claimed is:

1. A method of reducing the sensitivity of an optical device to post-weld drift, the device including a radiation emitter or detector and a lens system including a collimating lens, a focussing lens and a compensating lens, the method comprising the steps of:
   (i) directing an optical beam at the lens system in a first position, such that an output collimated beam is produced;
   (ii) adjusting the position of the collimating lens relative to a source of the optical beam to optimise collimisation;
   (iii) directing the optimised collimated optical beam at a focusing lens to focus the optimised collimated optical beam;
   (iv) adjusting the position of the focusing lens to focus the optimised collimated optical beam onto an output device;
   (v) welding the focusing lens in its adjusted position;
   (vi) positioning the compensating lens in the path of the focused collimated optical beam; and
   (vii) adjusting the position of the compensating lens to correct for any errors in setting the focusing lens.

2. A method according to claim 1, wherein the focusing lens and the compensating lens are positioned simultaneously so as to achieve optimum coupling, prior to welding of the focusing lens.

3. A method according to claim 2, wherein the position of the compensating lens is further adjusted after welding of the focusing lens so as to compensate for any deviation from the optimum coupling.

4. A method according to claim 1, wherein the collimating lens and the focusing lens are positioned simultaneously so as to achieve optimum coupling therebetween, prior to fixing of the collimating lens.

5. A method according to claim 1, the focusing lens is welded to each side of a lens holder at two separate positions.

6. A method according to claim 1, wherein the focal length of the compensating lens is greater than the focal length of the focusing lens.

7. A method according to claim 6, wherein the focal length of the compensating lens is in the range of 10 to 20 times greater than the focal length of the focusing lens.

8. An optical device having its sensitivity to post-weld drift reduced by the method according to claim 1.

9. A laser transmitter unit including an optical device according to claim 8.

10. A laser transmitter unit according to claim 9, in which the radiation emitted by the unit is 1530 nm.

11. A method according to claim 2, the focusing lens is welded to each side of a lens holder at two separate positions.

12. A method according to claim 3, the focusing lens is welded to each side of a lens holder at two separate positions.

13. A method according to claim 4, the focusing lens is welded to each side of a lens holder at two separate positions.

14. A method according to claim 2, wherein the focal length of the compensating lens is greater than the focal length of the focusing lens.

15. A method according to claim 3, wherein the focal length of the compensating lens is greater than the focal length of the focusing lens.

16. A method according to claim 4, wherein the focal length of the compensating lens is greater than the focal length of the focusing lens.

17. An optical device having its sensitivity to post-weld drift reduced by the method according to claim 2.

18. An optical device having its sensitivity to post-weld drift reduced by the method according to claim 3.

19. An optical device having its sensitivity to post-weld drift reduced by the method according to claim 4.

20. An optical device having its sensitivity to post-weld drift reduced by the method according to claim 7.

* * * * *